United States Patent
Wiest et al.

(10) Patent No.: US 7,650,315 B2
(45) Date of Patent: Jan. 19, 2010

(54) TRANSACTION SERVER AND COMPUTER PROGRAMME PRODUCT

(75) Inventors: Robert Wiest, Zurich (CH); Motti M. Goldberg, Kilchberg (CH)

(73) Assignee: Swiss Reinsurance Company, Zurich (CH)

( * ) Notice: Subject to any disclaimer, the term of this patent is extended or adjusted under 35 U.S.C. 154(b) by 408 days.

(21) Appl. No.: 10/542,174

(22) PCT Filed: Jul. 22, 2004

(86) PCT No.: PCT/CH2004/000462
§ 371 (c)(1),
(2), (4) Date: Jul. 14, 2005

(87) PCT Pub. No.: WO2005/010784
PCT Pub. Date: Feb. 3, 2005

(65) Prior Publication Data
US 2006/0053083 A1    Mar. 9, 2006

(51) Int. Cl.
*G06Q 40/00* (2006.01)
(52) U.S. Cl. .................................................. 705/400
(58) Field of Classification Search .................. 705/20, 705/26–27, 37, 80, 400; 707/1–6; 235/378
See application file for complete search history.

(56) References Cited

U.S. PATENT DOCUMENTS 6,141,653 A    10/2000    Conklin et al.
2002/0046169 A1*    4/2002    Keresman et al. ............. 705/41

FOREIGN PATENT DOCUMENTS

JP    2002074206    3/2002

(Continued)

OTHER PUBLICATIONS

Ayres et al., "Internalizing Outsider Trading", Michigan Law Review v101n2 pp. 313-408, Nov. 2002.*

(Continued)

*Primary Examiner*—Mary Cheung
(74) *Attorney, Agent, or Firm*—Oblon, Spivak, McClelland, Maier & Neustadt, L.L.P.

(57) ABSTRACT

A computerized transaction server (1), for the conclusion of contracts between service users and service providers, comprises a user interface with several data input modules (151), having data input fields for the input of data relating to the object of the contract. Data rules and business rules, provided for the data input fields, are stored in a regulatory databank (18). The quality of inputted data values are verified by the transaction server (1), according to the provided data rules and the data values are evaluated based on the provided business rules. Various contract conclusion processes (141, 142) and/or data input modules (151) for the input of additional data are automatically selected and activated by the transaction server, depending on the result of the evaluation. For the checking and evaluation of the data values, sets of rules with differing business rules and/or data rules are selected by the transaction server (1), depending on inputted data values. The transaction server (1) permits a complex and flexibly configurable automatic evaluation or inputted data values and dynamic and automatically adjustable data input sequence and process operation plan dependent on inputted data values and stored business rules.

13 Claims, 3 Drawing Sheets

FOREIGN PATENT DOCUMENTS

| | | |
|---|---|---|
| JP | 2002175416 | 6/2002 |
| WO | WO 02/39358 A2 | 5/2002 |
| WO | WO0239358 A2 | 5/2002 |
| WO | WO 03/034312 | 4/2003 |
| WO | WO03034312 A2 | 4/2003 |

OTHER PUBLICATIONS

Examiner's First Report from corresponding Australian Patent Application No. 2004260169, dated Apr. 19, 2007, 2 pages.

Office Action from corresponding Japan Patent Application No. 2005-518243, dated Dec. 11, 2007, 6 pages.

* cited by examiner

TRANSACTION SERVER AND COMPUTER PROGRAMME PRODUCT

TECHNICAL FIELD

The present invention relates to a computerized transaction server and a computer program product for concluding contracts between a service user and a service provider. In particular, the present invention relates to a computerized transaction server which comprises a user interface with data input fields for inputting data relating to the object of a contract, stored data rules assigned to the data input fields, and validation means, the user interface being operable for service users by means of terminals via a telecommunication network and the validation means being adapted for checking data values input via the data input fields on the basis of the assigned data rules, for requesting corrections via the user interface in accordance with the assigned data rules and for generating a validation result.

PRIOR ART

Computerized systems with user interfaces for receiving data for contract conclusions between a service user and a service provider are presently available, in particular, via the Internet. To increase the quality of the data acquisition, the known systems are typically equipped with validation means in order to check the input data values on the basis of data rules which are assigned to data input fields of the user interfaces and for requesting, if necessary, corrections via the user interface. In the case of products or services which are assigned to fixed purchase prices, sales contracts can be automatically concluded on line by the known systems. If, however, the objects of contracts relate to services which cannot be simply assigned contract conditions and, in particular, prices on a one-to-one basis, the known systems are only suitable for data acquisition for ordering services or applying for services which must be dealt with "manually" by professional assistants of the service provider at a later time. This means that contracts for services which are dependent on many conditions and factors, for example insurance services which depend on numerous and different risk factors and insurance conditions, cannot be concluded automatically and on-line by the known systems. In the known systems, it is possible to deal differently with users from different countries and/or language regions by selecting and activating different user interfaces in accordance with the specification of the relevant country or of relevant language region for the user. For example, the user is presented with a country- or language-specific graphical user interface. The existence of a number of different user interfaces for different user groups increases the complexity and maintenance costs of the system. For example, a general change of the user interface must be carried out in all country- and language-specific graphic user interfaces.

SUMMARY OF THE INVENTION

It is an object of the present invention to propose a computerized transaction server for concluding contracts between a service user and a service provider, which does not exhibit the disadvantages of the known systems. In particular, it is an object of the present invention to propose a computerized transaction server which comprises a user interface, which can be operated by means of terminals via a telecommunication network for service users, comprising data input fields for inputting data relating to the object of a contract, which is available and can be used as universal user interface by the service user independently of the location or the desired object of a contract (service). In particular, it is a further object of the present invention to propose a computerized transaction server which comprises a universal user interface which can be adapted flexibly to variable business conditions and objects of a contract without changes which are visible to the service user.

According to the present invention, these objects are achieved, in particular, by the elements of the independent claims. Further advantageous embodiments can also be found in the dependent claims and the description.

The computerized transaction server for concluding contracts between a service user and a service provider comprises a user interface which can be operated by service users by means of terminals via a telecommunication network. The user interface exhibits a number of data input modules which comprise data input fields for inputting data relating to the object of a contract. The transaction server also comprises stored data rules which are assigned to the data input fields, and validation means for checking data values input via the data input fields on the basis of the assigned data rules, for requesting corrections via the user interface in dependence on the assigned data rules and for generating a validation result.

In particular, the abovementioned objects are achieved by the present invention in that the transaction server comprises stored business rules which are assigned to one or more of the data input fields, and that the transaction server comprises evaluation means for evaluating the data values input via the data input fields on the basis of the assigned business rules and for generating a corresponding evaluation result, that the transaction server comprises a number of different contract negotiation processes for indicating a contract price via the user interface, for requesting and receiving an agreement for concluding a contract from the service user via the user interface, and for storing a concluded contract, and that the transaction server comprises control means for activating a first one of the data input modules, for activating the evaluation means in the case of a positive validation result, and for automatically selecting and activating a further one of the data input modules or one of the contract negotiation processes in dependence on the evaluation result. The transaction server is adapted, for example, for concluding reinsurance contracts between an insurance company as service user and a reinsurance company as service provider and the data relating to the object of a contract correspondingly comprise information on insurance products and insurance amounts. The allocation of a number of business rules to one or more data input fields provides for a complex and flexibly configurable automatic evaluation of the data values input, data values of individual data input fields and/or mutual relations of data values of a number of data input fields being examined. By storing alternative business rules and/or changing the allocation of business rules, conditions on data values input or on relations between data values input can be dynamically and flexibly changed without this requiring changes at the user interface or program changes on the transaction server to be performed. The automatic selection and activation of different data input modules in dependence on the evaluation result provides for the execution of dynamically and automatically changeable data input sequences and process flow patterns in dependence on data values input and business rules stored. The automatic selection and activation of different contract negotiation processes in dependence on the evaluation result provide for the execution of dynamically and automatically changeable processing and process flow patterns for the contract conclusion in dependence on data values input and business rules stored. The sequence control, which activates and/or selects other modules, processes and program parts in dependence on status values provides for a modular architecture in which individual modules, processes and/or process parts can be replaced without this requiring changes in the sequence control.

The transaction server advantageously comprises a rules database in which the business rules are stored, and the business rules in each case comprise a rule logic and one or more rule parameters, the rule logic being stored as an executable program code in one variant of an embodiment. Storing the business rules in a database provides for maximum flexibility since the business rules can be changed dynamically and, if necessary, under remote control. Storing the rule logic as executable program code has the advantage that complex rules can be dynamically changed for the transaction server without this requiring program changes to be performed on the transaction server.

The data rules and business rules are advantageously assigned in each case to one of a number of sets of rules and the control means are adapted to select from the sets of rules a set of rules to be applied in dependence on at least one data value input into a particular data input field. The validation means and the evaluation means are correspondingly adapted to check or to evaluate, respectively, the input data values on the basis of the data rules or business rules of the set of rules to be applied. The particular data input field is provided, for example, for inputting geographic data values, for inputting data values for user identification or for inputting data values for service identification. Correspondingly, geographic data, user identification data and/or service identification data are in each case assigned to the sets of rules and the control means are adapted to select the set of rules to be applied in dependence on a geographic data value input, a data value for user identification input and/or a data value for service identification input. Due to the dynamic change of active rules in the transaction server in dependence on data values input, it is possible to design and to provide the user interface as a universal interface and, at the same time, still to adapt the level of requirement of the data and the business rules to be applied to different conditions such as geographic region (e.g. country or region) or user (e.g. company or group of customers).

At least one of the contract negotiation processes is preferably adapted to automatically calculating the contract price on the basis of data values input. An automated contract conclusion can save financial costs which would be incurred with the processing by a human representative of the service provider. In addition, the automatic contract conclusion is carried out, as a rule, in much shorter time than a "manual" contract conclusion which is supported by a human representative. Since the selection and activation of the automated contract conclusion is based on the rule-dependent validation and evaluation of the data values input, it is possible to ensure that the automated contract conclusion is only applied if the data values input are correct, plausible and complete and meet the requirements of the business conditions.

At least one of the contract negotiation processes is advantageously adapted to make the data values input electronically accessible to a responsible human representative of the service provider, to receive data inputs from the human representative, to indicate input data from the human representative to the service user via the user interface and to negotiate the contract price by means of data exchange via the user interface between the service user and the human representative. Although a "manual" contact conclusion, in which a human representative of the service provider is involved, produces higher financial costs for the service provider than an automated contract conclusion, an intervention via a human representative may be desirable depending on the business conditions, for example particularly complex, high-risk or costly objects of a contract.

In a variant of the embodiment, the control means are adapted to store the input data values, the validation result generated and the evaluation result generated assigned to one another. The stored data values and status values are available not only for further processing of the relevant contract conclusion but, in particular, can also be used as a basis for improvements in the user interface or for adaptation of the rules at a later time.

The present invention is also related to a computer program product which comprises a computer-readable medium with computer program code means, contained therein, for controlling one or more processors of the transaction server. The computer program code means control the processors of the transaction server in such a manner that the transaction server provides a user interface with a number of data input modules which comprise data input fields for inputting data relating to an object of a contract, which user interface can be operated by service users by means of terminals via a telecommunication network, that data rules are stored in the transaction server assigned to the data input fields, that data values input via the data input fields are checked in the transaction server on the basis of the assigned data rules, that the transaction server requests corrections via the user interface on the basis of the assigned data rules, that the transaction server generates a validation result, that business rules are stored in the transaction server assigned to one or more of the data input fields, that the transaction server activates a first one of the data input modules, that in the case of a positive validation result, the transaction server evaluates the data values input via the data input fields on the basis of the assigned business rules and generates a corresponding evaluation result, and that the transaction server selects and activates a further one of the data input modules or one of a number of different contract negotiation processes in dependence on the evaluation result, the contract negotiation processes being adapted to control the processors of the transaction server in such a manner that the transaction server indicates a contract price via the user interface, that the transaction server requests and receives an agreement on the conclusion of a contract from the service user via the user interface, and that the transaction server stores a concluded contract.

BRIEF DESCRIPTION OF THE DRAWINGS

In the text which follows, an embodiment of the present invention is described by means of an example. The example of the embodiment is illustrated by the following attached figures.

APPROACHES TO CARRYING OUT THE INVENTION

Figure 1:
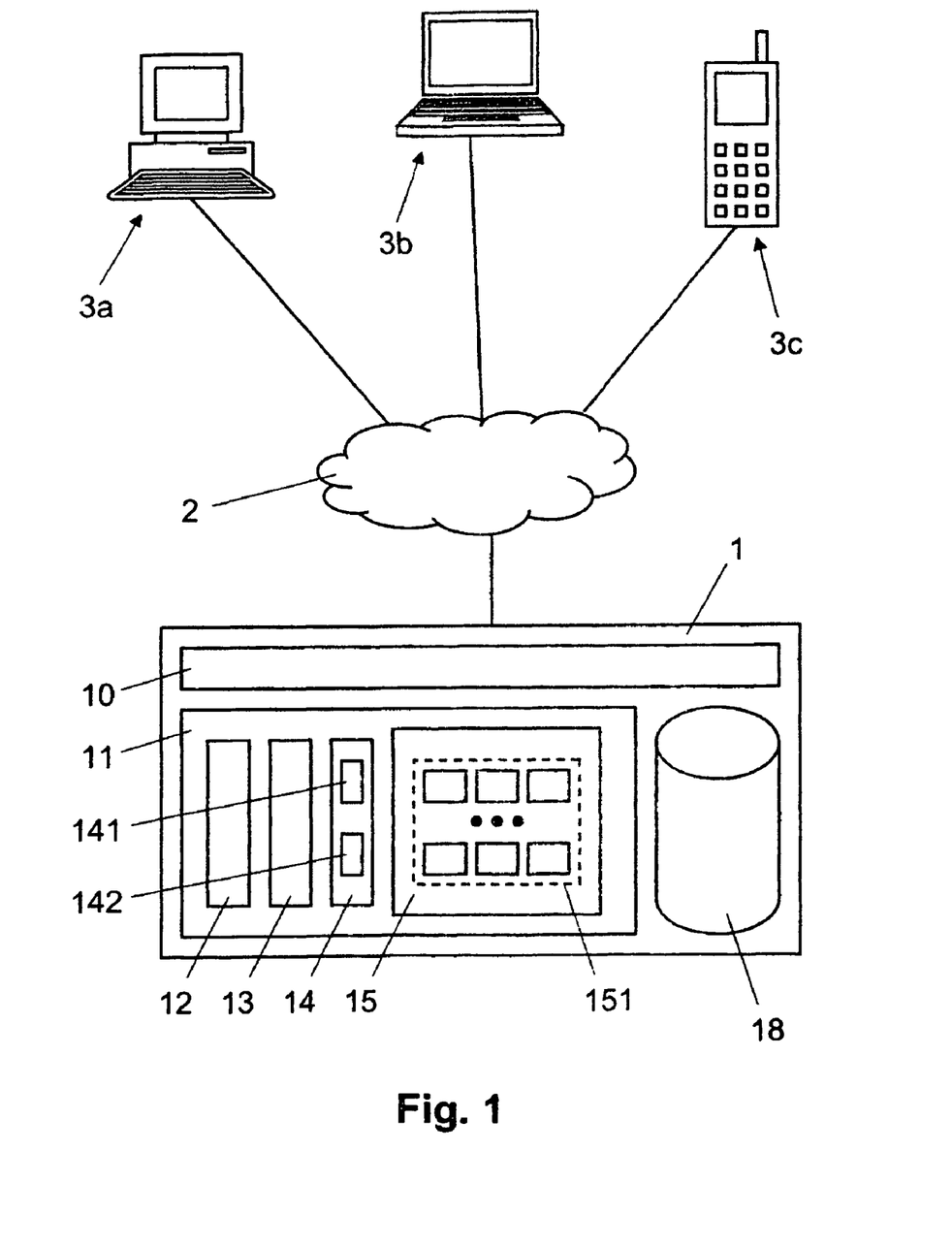
FIG. 1 shows a block diagram which diagrammatically represents a computerized transaction server for concluding contracts between a service user and a service provider, the transaction server being connectable to terminals of service users via a telecommunication network.

In FIG. 1, the reference symbol 1 designates a computerized transaction server for concluding contracts between a service user and a service provider. The transaction server 1 is operated by the service provider and comprises one or more computers with in each case one or more processors. As is shown diagrammatically in FIG. 1, the transaction server 1 is connected to various terminals 3a, 3b and 3c of the service users via a telecommunication network 2. The telecommunication network 2 comprises a landline network and/or a mobile network. The landline network is, for example, the public switched telephone network, an ISDN (Integrated Services Digital Network) network or preferably the Internet or an intranet. The mobile network is, for example, a GSM network (Global System for Mobile communication), a UMTS network (Universal Mobile Telephone System) or another, for example, satellite-based mobile network, or a WLAN (Wireless Local Area Network). The reference symbol 3a designates a terminal which is constructed as PC (Personal Computer), the reference symbol 3b designates a terminal which is constructed as mobile notebook or laptop computer, and the reference symbol 3c designates a terminal which is constructed as mobile radio telephone or PDA computer (Personal Digital Assistant). The transaction server 1 comprises a communication module 10 for the communication, that is to say for the data exchange, with the terminals 3a, 3b, 3c. The communication module 10 is, for example, adapted to set up in each case a virtual private network (VPN) with the terminals 3a, 3b, 3c via the telecommunication network 2 and to communicate with the terminals 3a, 3b, 3c via this virtual private network.

As shown in FIG. 1, the transaction server 1 comprises a rules database 18 and a number of functional modules and parts, namely a control module 11, validation means 12, evaluation means 13, a contract negotiation process module 14 and a user interface module 15. The contract negotiation process module 14 comprises an automated contract negotiation process 141 and a semi-automated contract negotiation process 142 which will be described in greater detail later with reference to FIG. 2. The functional modules and parts are preferably constructed as programmed software modules or software parts on a computer program product. The computer program product preferably comprises a computer-readable medium which contains the computer program code of the functional modules and parts. The computer-readable medium is constructed as a fixed memory in the transaction server 1 or is supplied to the transaction server as mobile data medium, e.g. as CD (compact disk).

The user interface module 15 comprises the program code for a user interface to the transaction server 1 which can be operated by service users by means of the terminals 3a, 3b, 3c via the telecommunication network 2. The user interface is provided, for example, via so-called browser programs or as API (Application Programming Interface). The expert will understand that the user interface can also be constructed as GUI (Graphical User Interface) in a client server architecture. As is indicated by area 151 in FIG. 1, the user interface module 15 comprises a number of data input modules. The data input modules in each case comprise data input fields which, in particular, are used for inputting data relating to the object of a contract. Depending on the construction of the user interface, the data input modules 151 in each case comprise one or more displayable windows or GUI images ("screens") or a scrollable form. The data input modules 151 are preferably assigned to various paths of a workflow. The user interface can also be provided with a voice recognition module for the data input.

The rules database 18 comprises information on data rules and business rules. The data rules and business rules in each case comprise one or more rule parameters and a rule logic. In the rules database 18, at least the rule parameters but preferably also the rule logic are stored. The rule logic is preferably stored as program code which can be executed on the transaction server 1, for example as so-called applet in Java. As is shown in Table 1 by means of the examples of the business rules BR1, BR2, BR3, BR4, and BR5, the rule logic comprises at least one or more regulatory conditions (specified in pseudocode in Table 1). In the example specified, the regulatory conditions relate to the data values of the data input fields DF1, DF2, DF3, DF4, DF5, DF6, DF7, DF8 and DF9 and to the rule parameters A, B, C, D, E, F and G. In Table 1, examples of regulatory actions are also shown which are executed in accordance with an evaluation result which is determined on the basis of the regulatory conditions. The examples of the regulatory actions specified relate to the activation of the data input modules DM2, DM3 and DM4 and to the activation of the automated contract negotiation process PA or the semiautomatic contract negotiation process PM. The rule logic stored in the rules database 18 comprises the regulatory conditions. In the various variants of embodiments, the regulatory actions are either permanently coded as part of the control module 11 or stored in the rules database 18 as part of the rule logic.

TABLE 1

| | Business rule | | | |
|---|---|---|---|---|
| | Rule logic | | | |
| | Regulatory condition | Regulatory action (optional) | Rule parameter | Evaluation result |
| BR1 | BOOLEAN (DF1 < A) | IF NEGATIVE ACTIVATE DM2 | A: 10'000 | {POSITIVE, NEGATIVE} |
| BR2 | BOOLEAN (DF2 + DF3 + DF4) < B | IF NEGATIVE ACTIVATE DM3 | B: 100'000 | {POSITIVE, NEGATIVE} |
| BR3 | BOOLEAN (DF1 + DF3) < G | IF NEGATIVE ACTIVATE DM4 | G: 20'000 | {POSITIVE, NEGATIVE} |
| BR4 | BOOLEAN (DF5 < C AND DF6 < 10% DF7 AND DF8 NOT D) | IF NEGATIVE ACTIVATE PM ELSE ACTIVATE PA | C: 50'000 D: "Fire" | {POSITIVE, NEGATIVE} |
| BR5 | IF DF9 < E THEN OPTION 1 IF DF9 < F THEN OPTION 2 ELSE OPTION3 | IF OPTION1 ACTIVATE PA ELSE IF OPTION2 ACTIVATE DM4 ELSE ACTIVATE PM | E: 50'000 F: 100'000 | {OPTION1, OPTION2, OPTION3} |

The data rules and business rules are in each case assigned to one or more data input fields of the data input modules. The data rules are used by the validation means 12 for ensuring the quality of the data input. The data rules specify correct syntax and format, define prescribed value ranges, regulate plausibility and relations between data values of a number of data input fields, for example a first data item must come before a second data item, and prescribe which data must be mandatorily input. The data rules are also used for checking and ensuring that the data values input fit into a defined mathematical model or a mathematical formula. The business rules are used by the evaluation means 13 and the control module 11, respectively, for controlling the work flow on the basis of the data input, selecting various flow paths and activating assigned data input modules and/or contract negotiation processes 141, 142. The business rules provide for a data-controlled multi-stage nested process of selection. For example, the service user can be requested by activation of a data input module to input further additional data values if a data value input or a sum of a number of data values input exceeds a defined threshold value or if a particular class or group of contract objects is specified on the basis of the data input. As long as the evaluation means 13 consider the conditions set by the business rules to be met (positive evaluation result), the control module 11 conducts the process flow along paths with minimum data input. If, however, the evaluation means 13 consider the conditions set by the business rules as not met (negative evaluation result), the control module 11 conducts the process flow along paths with additional data input and activates corresponding additional data input modules. The data rules and/or the business rules are assigned to sets of rules which are assigned different set identification data. The set identification data comprise geographic data, user identification data and/or service identification data. The set identification data enable data rules and/or business rules to be selected and activated in dependence on data values input.

Figure 2:
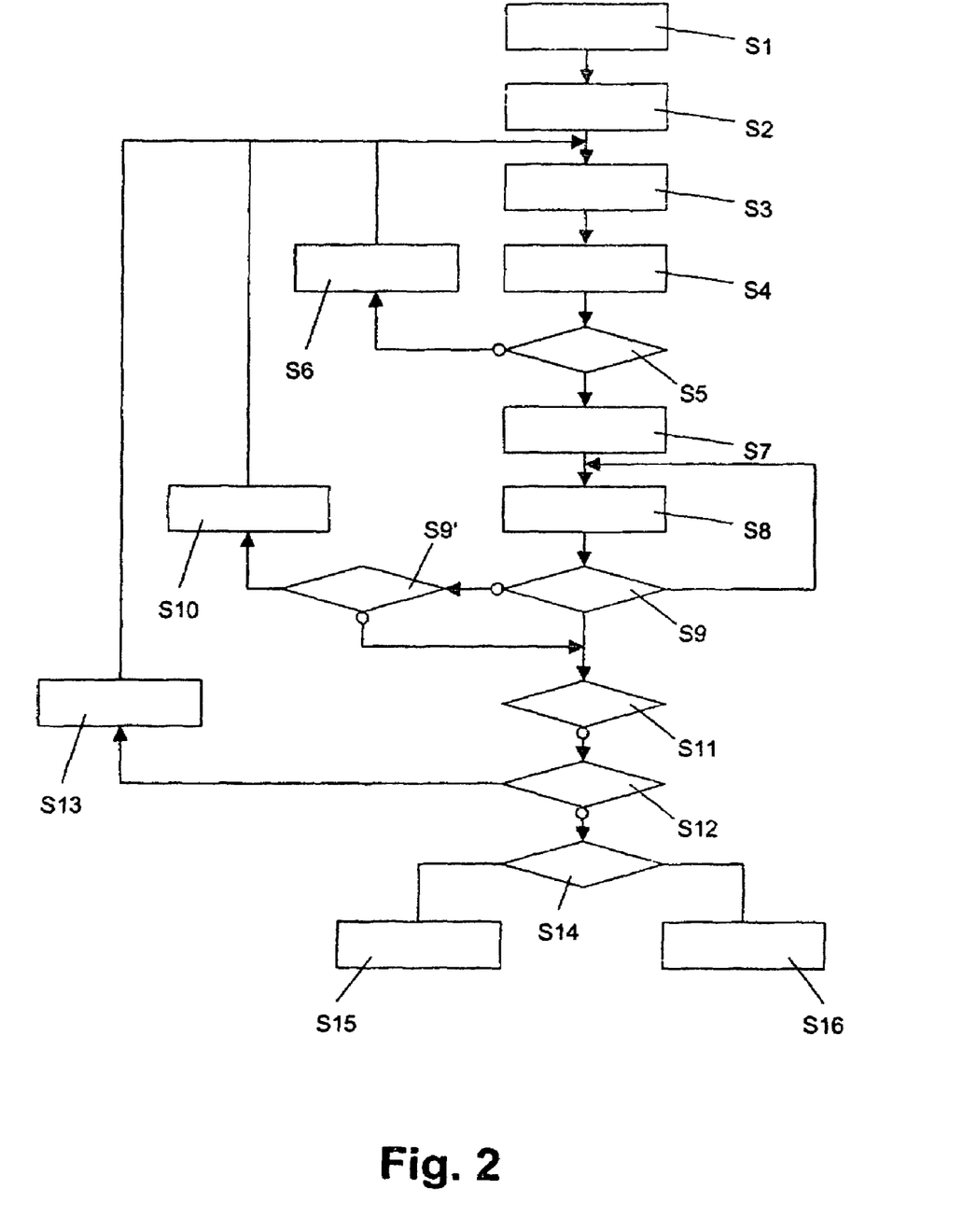
FIG. 2 shows a flowchart which diagrammatically represents the process flow in the transaction server during the concluding of contracts between a service user and a service provider.

In the sections following, a possible workflow during the conclusion of contracts between a service user and a service provider is described with reference to FIG. 2.

In step S1, a service user accesses the transaction server 1 by means of a terminal 3a, 3b, 3c via the telecommunication network 2.

In step S2, the transaction server 1 provides a user interface for the service user by means of the user interface module 15. During this process, a first one of the data input modules 151 is activated which is selected by the control module 11 in accordance with a defined workflow. The workflow can be permanently programmed in the control module 11 or designed to be flexible and variable by means of storage of data elements in a database (e.g. by combining path or step identifications with data input module identifications).

In step S3, the transaction server 1 receives via the user interface provided in step S2 data values which are input by the service user via data input fields of the activated data input module and are transferred to the transaction server 1 by means of the terminal 3a, 3b, 3c via the telecommunication network 2.

In step S4, the validation means 12 check the data received in step S3. The data are checked on the basis of the stored data rules which are assigned to the data input fields of the activated data input module. The validation means 12 generate a validation result in accordance with the result of the check. The validation result specifies whether the data values meet the requirements of the data rules (positive validation result) or if they have to be corrected and/or supplemented (negative validation result). The validation result also comprises information on the identification of the data values to be corrected and/or to be supplemented. The data values received are stored assigned to the validation result generated. The expert will understand that the validation means 12 for validating the data values can be constructed by program sections in the user interface "close" to the service user, by a program module in the control module 11 of the transaction server 1 or by data integrity rules in the database management system (DBMS).

In step S5, the control module 11 checks whether a positive validation result was generated in step S4.

If no positive validation result was generated, the service user is informed via the user interface in step S6 which data values must be supplemented or corrected. The data supplemented or corrected are received in step S3.

If a positive validation result was generated, the control module 11 activates the evaluation means 13 in step S7.

In step S8, the evaluation means 13 evaluate the data values received in step S3, which were originally input and/or corrected and/or supplemented in accordance with the instructions of step S6. Data values are evaluated on the basis of the stored business rules which are assigned to the data input fields of the activated data input module. The business rules to be applied are preferably selected in dependence on the data values which were received in step S3 via a data input field defined for the choice of rule. During this process, the set of rules is selected, the set identification data of which correspond to the data values received which were received via the data input field defined for the choice of rules. For example, different sets of rules with business rules to be applied can be selected in dependence on geographic data received, which, for example, designate the country or the region of the service user, on user identification data received which designate, for example, the company or the user group of the service user, and/or on service identification data received which designate the object of the contract. The data-dependent selection of business rules is defined, for example, in a business rule or instruction which is assigned to the relevant data input field provided for the choice of rule. The business rules are preferably loaded from the rules database 18 and executed on a processor of the transaction server 1. The evaluation means 13 check the regulatory conditions defined by the business rules and generate an evaluation result in accordance with the result of this evaluation. The evaluation result generated is stored assigned to the relevant received data values stored in step S4. The expert will understand that the evaluation means 13 for the evaluation of the data values can be constructed by program parts of the control module 11 or by program parts of the business rules.

In step S9, the control module 11 checks whether a positive evaluation result was generated in step S8.

If no positive evaluation result was generated in step S8 and if additional data values need to be acquired in accordance with the defined workflow for the relevant business rule(s) (indicated by step S9'), the control module 11 activates one of the data input modules 151 in step S10. The additional data input module is selected by the control module 11 in accordance with the business rule or rules, the conditions of which were not met in step S8. The correlation between data input modules 151 and business conditions can be permanently programmed in the control module 11 or designed to be flexible and variable by combining data elements in a database (e.g. by combining business condition identification and data input module identification). The data additionally expected are received in step S3.

If a positive evaluation result was generated in step S8 or if no additional data values need to be acquired (from step S9') in the case of a negative evaluation result, the control module 11 checks in step S11 whether further business rules need to be checked which are assigned to the data input fields of the activated data input module. If necessary, further business rules are checked in step S8.

If the data values were evaluated in accordance with all business rules which are assigned to the data input fields of the data input module activated, the control module 11 checks in step S12 whether data input modules for the acquisition of further data values need to be activated in accordance with the workflow defined. If necessary, the control module 11 activates a further one of the data input modules 151 in step S13 in accordance with the workflow defined. The expected further data are received in step S3.

If no further data are to be acquired, the control module 11 selects in step S14 the automated contract negotiation process 141 if a positive evaluation result was generated in step S8 or the semi-automated contract negotiation process 142 if a negative evaluation result was generated in step S8.

In step S15, the automated contract negotiation process 141 is activated and executed. The automated contract negotiation process 141 calculates a contract price on the basis of the data values acquired in step S3 and on the basis of permanently programmed or variably stored business rules. The contract price calculated is indicated to the service user via the user interface and the service user is requested to input an agreement regarding the conclusion of the contract. If no agreement is received, the data exchange between service user and service provider ends without contract conclusion. Otherwise, the contract is stored on the basis of the calculated contract price and the data values acquired.

In step S15, the semi-automated contract negotiation process 142 is activated and executed. The semi-automated contract negotiation process 142 conducts the data values acquired in step S3 to a human representative of the service provider, preferably via a GUI interface. On the basis of the data values acquired, the human representative determines a contract price and enters this contract price via the GUI interface. The transaction server 1 indicates the contract price, determined by the human representative, to the service user via the user interface of the transaction server 1. As in the case of the automated contract negotiation process 141, the service user is requested to input an agreement for the indicated price for concluding the contract. If no agreement but a rejection is received, the human representative and/or the service provider has the possibility of specifying a new contract price and communicating this to the service user or the human representative, respectively, via the transaction server 1. It can also be provided that the service user cannot change the proposed contract price but other contract conditions, input as data values, for negotiation purposes. In this manner, a contract price and/or contract conditions can be negotiated between the service user and the human representative. If no agreement is reached, the data exchange between service user and service provider ends without contract conclusion. Otherwise, the contract is stored on the basis of the proposed contract price and the acquired data values or altered data values, respectively.

In the sections following, an example of a simplified workflow during the conclusion of contracts between a service user and a service provider is described with reference to FIG. 3. In the simplified example according to FIG. 3, the reference to data rules and the data validation of data values input based on these rules is omitted. In the simplified example according to FIG. 3, the number of business rules is also greatly reduced. In one embodiment, for example, five hundred to one thousand business rules can be used. In the simplified example according to FIG. 3, the possible evaluation result values are in each case restricted to "positive" (+) and negative (−). The expert will understand that evaluation result values are also possible which can assume more than only two values (see example BR5 in Table 1).

Figure 3:
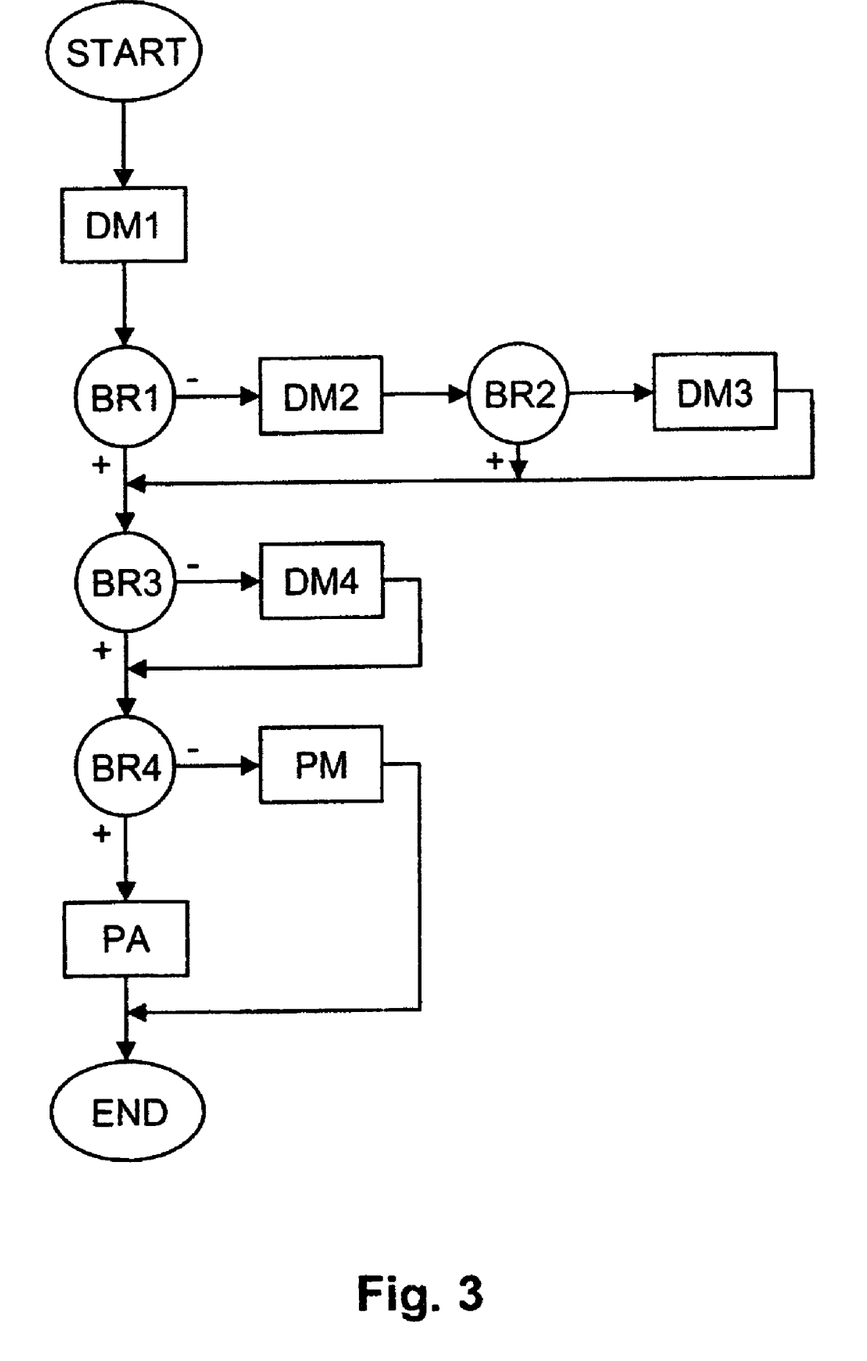
FIG. 3 shows a flowchart which shows an example of a simplified process flow in the transaction server during the concluding of contracts between a service user and a service provider.

In the example according to FIG. 3, the control module 11 first selects and activates the data input module DM1 in order to enable the service user to input data relating to the object of a contract. The data values input via the input fields of the data input module DM1 are evaluated on the basis of the assigned business rule BR1 (see example in Table 1).

If the evaluation according to business rule BR1 results in a negative evaluation result, the data input module DM2 is activated in order to request additional data values for the service user. The data values input via the input fields of the data input module DM2 are evaluated on the basis of the assigned business rule BR2 (see example in Table 1). If the evaluation according to business rule BR2 results in a positive evaluation result, a further evaluation takes place on the basis of the business rule BR3 (see example in Table 1). If the evaluation according to business rule BR2 results in a negative evaluation result, the data input module DM3 is activated in order to request additional data values for the service user.

If the evaluation according to business rule BR1 results in a positive evaluation result, the data values input via the input fields of the data input module DM1 are evaluated on the basis of the next assigned business rule BR3. It is also possible that business rule BR3 can also be applied to additional data values which have been input via data input fields of the additional data input modules DM2 and/or DM3.

If the evaluation according to business rule BR3 results in a negative evaluation result, the data input module DM4 is activated in order to request additional data values from the service user. If the evaluation according to business rule BR3 results in a positive evaluation result, the data values which were input via the input fields of the data input module DM1 and possibly also via the input fields of data input module DM2, DM3 and DM4 are evaluated on the basis of business rule BR4 (see example in Table 1).

If the evaluation according to business rule BR4 results in a negative evaluation result, the semi-automated contract negotiation process PM is activated. If the evaluation according to business rule BR4 results in a positive evaluation result, the automated contract negotiation process PA is activated.

The workflow according to FIG. 3 can be programmed as is shown below with pseudocode.

```
START
    Activate DM1
    Apply BR1
    IF NEGATIVE
        Activate DM2
        Apply BR2
        IF NEGATIVE
            Activate DM3
        END IF
    END IF
    Apply BR3
    IF NEGATIVE
        Activate DM4
    END IF
    Apply BR4
    IF NEGATIVE
        Activate PM
    ELSE
        Activate PA
    END IF
END
```

The workflow can be programmed completely and permanently in control module 11. However, the business rules are preferably loaded dynamically from the rules database 18 at run time and executed. In one variant of an embodiment, the workflow is programmed in such a manner that even the references to the business rules are dynamically determined at run time. In this process, the references are determined from the database on the basis of the correlation of the business rules with the data input fields of the activated data input module. In one variant of an embodiment, the data input modules for inputting additional data values are also dynamically determined during run time. For this purpose, these additional data input modules are referenced in the business rules which are stored in the rules database 18.

The proposed transaction server 1 is suitable, in particular, for concluding reinsurance contracts between an insurance company as service user and a reinsurance company as service provider. For this purpose, the data relating to the object of a contract contain information on service user, insurance products, insurance objects, insurance risks, insurance conditions such as excess amounts and sums insured. Insurance products comprise, for example, liability or property insurances. Property insurances comprise information on objects to be insured and assigned sums insured. In dependence on the total sum insured, on the service user and on the country of the service user, different workflows are obtained on the basis of the business rules. For example, intervention of a human representative of the service provider may be required above a certain limit amount of the total sum insured. This limit amount can be set at different levels for different countries and/or groups of service users, for example this limit amount can be different for service users from different industrial or professional groups. For certain service users, additional information or the intervention of a human representative of the service provider may be required, for example because the relevant service user has already submitted an above average number of damage claims. For certain insurance products or objects, the provision of additional information, the intervention of a human representative of the service provider and/or a different calculation of the contract price may be required generally or only in particular countries or regions, for example because the relevant insurance product or object requires further explanations according to regulations (e.g. property insurances for petrochemical products) or because the relevant insurance product or object exhibits a greater risk in the relevant country or region (e.g. a building insurance for a building in a region with earthquake risk). In relation to insurances, the contract price is the insurance price or the insurance premium.

The invention claimed is:

1. A computerized transaction server having a processor for concluding contracts between a service user and a service provider, comprising:
   a user interface with a number of data input modules which comprise data input fields for inputting data relating to the object of a contract, the user interface servicing users by way of terminals via a telecommunication network;
   stored data rules assigned to the data input fields;
   a validation module implemented by the processor and configured to check data values input via the data input fields on the basis of the assigned data rules to request corrections via the user interface on the basis of the assigned data rules and to generate a validation result;
   stored business rules assigned to one or more of the data input fields;
   an evaluation module configured to evaluate the data values input via the data input fields on the basis of the assigned business rules and configured to generate a corresponding evaluation result, and
   a plurality of contract negotiation process units configured to indicate a contract price via the user interface, to request and receive an agreement relating to the conclusion of a contract from the service user via the user interface, and to store a concluded contract;
   a control module configured to activate a first one of the data input modules, to activate the evaluation module in the case of a positive validation result, and to automatically select and activate a further one of the data input modules or one of the plurality of contract negotiation process units based on the evaluation result,
   wherein the plurality of contract negotiation process units indicate a contract price based on the data value input via the data input fields and based on a first predetermined criteria when a positive evaluation result is determined and based on a second predetermined criteria when a negative evaluation result is determined.

2. The transaction server as claimed in claim 1, wherein the business rules in each case comprise rule logic and one or more rule parameters, and the transaction server comprises a rules database and that the rule parameters are stored in the rules database.

3. The transaction server as claimed in claim 2, wherein the rule logic is stored in the rules database.

4. The transaction server as claimed in claim 1, wherein the data rules and business rules are in each case assigned to one of a number of sets of rules, the control module is configured to select a set of rules to be applied from the sets of rules in dependence on at least one data value input into a particular data input field, and the validation module and the evaluation module are configured to check and to evaluate, respectively, the data values input on the basis of the data rules or business rules, respectively, of the set of rules to be applied.

5. The transaction server as claimed in claim 4, wherein geographic data, user identification data and/or service identification data are in each case assigned to the sets of rules, and the control module is configured to select the set of rules to be applied in dependence on a geographic data value input or a data value for user identification input, respectively, and/or a data value for service identification input.

6. The transaction server as claimed in claim 1, wherein at least one of the contract negotiation process units is configured to automatically calculate the contract price on the basis of data values input.

7. The transaction server as claimed in claim 1, wherein at least one of the contract negotiation process units is configured to make the data values input electronically accessible to a responsible human representative of the service provider, to receive data inputs from the human representative, to provide them to the service user via the user interface and to negotiate the contract price by data exchange via the user interface between the service user and the human representative.

8. The transaction server as claimed in claim 1, wherein the control module is configured to store the data values input, the validation result generated and the evaluation result generated assigned to one another.

9. The transaction server as claimed in claim 1, wherein the transaction server is configured to conclude reinsurance contracts between an insurance company as service user and a reinsurance company as service provider and the data relating to the object of a contract comprises information on insurance products and sums insured.

10. A computer readable medium having stored thereon computer program code for controlling one or more processors of a transaction server for concluding contracts between a service user and a service provider, comprising:
   providing a user interface with a number of data input modules which comprise data input fields for inputting data relating to the object of a contract, the user interface servicing users by way of terminals via a telecommunication network,
   storing data rules in the transaction server assigned to the data input fields, checking data values input via the data input fields in the transaction server on the basis of the assigned data rules, requesting, using the transaction server, corrections via the user interface on the basis of the assigned data rules, generating, using the transaction server, a validation result, storing business rules in the transaction server assigned to one or more of the data input fields, activating, using the transaction server, a first one of the data input modules, evaluating, using the transaction server and in the case of a positive validation result, the data values input via the data input fields on the basis of the assigned business rules, generating a corresponding evaluation result, selecting and activating, using the transaction server, a further one of the data input modules or one of a number of different contract negotiation processes based on the evaluation result, the contract negotiation processes controlling the processors of the transaction server in such a manner that the transaction server indicates a contract price via the user interface, the contract price being determined based on the data values input via the data input fields and based on a first predetermined criteria when a positive evaluation result is generated and based on a second predetermined criteria when a negative evaluation result is generated, requesting and receiving, using the transaction server, an agreement relating to the conclusion of a contract from the service user via the user interface, and storing, using the transaction server, a concluded contract.

11. The computer readable medium as claimed in claim 10, further comprising storing, using the transaction server, rule parameters contained in the business rules in a rules database.

12. The computer readable medium as claimed in claim 10, further comprising storing, using the transaction server, a rule logic contained in the business rules as an executable program code in a rules database.

13. The computer readable medium as claimed in claim 10, further comprising storing, using the transaction server in each case, the data rules and business rules assigned to one of a number of sets of rules, selecting, using the transaction server, from the sets of rules one set of rules to be applied in dependence on at least one data value input into a particular data input field, and checking and evaluating, using the transaction server the data values input on the basis of the data rules or business rules, respectively, of the set of rules to be applied.

* * * * *